US006309716B1

(12) United States Patent
Fisher et al.

(10) Patent No.: US 6,309,716 B1
(45) Date of Patent: Oct. 30, 2001

(54) TESSELLATION SET

(76) Inventors: Adrian Fisher, Victoria Lodge, 5 Victoria Grove, Portsmouth, Hampshire Po5 1NE (GB); Edward Taylor Pegg, Jr., 529 S. Hancock Ave., Colorado Springs, CO (US) 80903

( * ) Notice: Subject to any disclaimer, the term of this patent is extended or adjusted under 35 U.S.C. 154(b) by 0 days.

(21) Appl. No.: 09/405,470

(22) Filed: Sep. 24, 1999

(51) Int. Cl.[7] .......................... F16B 2/00

(52) U.S. Cl. .......................... 428/33; 428/15; 428/44; 428/42; 428/54; 428/55; 428/542.2; 428/542.8; 434/81; 434/96; 434/211; 273/157 R; 273/293; 52/311.1; 52/311.2

(58) Field of Search .......................... 428/33, 44, 47, 428/55, 54, 15, 542.8, 542.2; 273/157 R, 156, 293, 153 R; 52/311.1, 311.2; 434/211, 81, 96

(56) References Cited

U.S. PATENT DOCUMENTS

| | | |
|---|---|---|
| 4,133,152 | 1/1979 | Penrose . |
| 4,223,890 | 9/1980 | Schoen . |
| 4,350,341 | 9/1982 | Wallace . |
| 4,550,040 | 10/1985 | Fisher . |
| 4,561,097 | 12/1985 | Siegel . |
| 5,194,969 | 3/1993 | DiFrancesco . |
| 5,314,183 | 5/1994 | Schoen . |
| 5,348,417 | 9/1994 | Scheiwiller . |
| 5,520,388 | 5/1996 | Osborn . |
| 5,560,173 | 10/1996 | Scheiwiller . |
| 5,697,520 | 12/1997 | Gerber . |
| 5,945,181 | 8/1999 | Fisher . |

FOREIGN PATENT DOCUMENTS

| | | |
|---|---|---|
| 42 43 584 A1 | 5/1994 | (DE) . |
| 0 487 807 | 6/1992 | (EP) . |
| 1 759 943 | 8/1998 | (FR) . |

*Primary Examiner*—Deborah Jones
*Assistant Examiner*—Abraham Bahta
(74) *Attorney, Agent, or Firm*—Brown Raysman Millstein Felder & Steiner LLP

(57) ABSTRACT

Sets of tessellatable elements are disclosed, in which a relatively low number of different elements may be combined together to provide very attractive tessellating patterns.

The elements may be in the form of tiles, for paving or for covering flooring or walls, for example, game pieces, including television and computer games, pieces for use in maze construction and for many other applications.

24 Claims, 9 Drawing Sheets

| ELEMENT | SET | NO. SIDES | RATIO OF SIDES | INTERNAL ANGLES |
|---|---|---|---|---|
| 5 (SQUARE) | ALL | 4 | 1:1:1:1 | 90°, 90°, 90°, 90° |
| 6 (SMALL SQUARE) | MITRE | 4 | FOUR OF 0.518 | 90°, 90°, 90°, 90° |
| 10 (PYRAMID) | MITRE | 4 | 0.518:1:1:1 | 90°, 60°, 75°, 135° |
| 15 (DIAMOND) | ALL | 4 | 1:1:1:1 | 60°, 120°, 60°, 120° |
| 20 (MITRE) | MITRE | 5 | 1:0.518:1:0.518:1 | 60°, 135°, 105°, 105°, 135° |
| 30 (FIN) | MITRE | 4 | 1:1:1.366:0.355 | 90°, 60°, 120°, 90° |
| 31 (CORK) | MITRE | 4 | 1:1:1:0.482 | 105°, 105°, 75°, 75° |
| 32 (FAN) | MITRE | 5 | 1:1:THREE OF 0.518 | 90°, 75°, 150°, 150°, 75° |
| 33 (BELL) | MITRE | 6 | SIX OF 0.518 | 90°, 120°, 90°, 120°, 90°, 120° |
| 39 (12 STAR) | 12-GON | 12 | TWELVE OF 1 | 270° AND 30° ALTERNATELY |
| 40 (PARROT) | 12-GON | 5 | 1:1:1:1:1 | 60°, 90°, 150°, 30°, 210° |
| 50 (HOUSE) | 12-GON | 5 | 1:1:1:1:1 | 90°, 90°, 150°, 60°, 150° |
| 51 (TRIANGLE) | 12-GON | 3 | 1:2:1.732 | 90°, 60°, 30° |
| 52 (12 SHARP DIAMOND) | 12-GON | 4 | 1:1:1:1 | 150°, 30°, 150°, 30° |
| 60 (CHAOS PARROT) | 18-GON | 5 | 1:1:1:1:1 | 40°, 200°, 60°, 100°, 140° |
| 70 (CHAOS HOUSE) | 18-GON | 5 | 1:1:1:1:1 | 80°, 160°, 60°, 140°, 100° |
| 71 (CHAOS PYRAMID) | 18-GON | 4 | 1:1:1:0.347 | 60°, 80°, 80°, 140° |
| 72 (CHAOS BLUNT DIAMOND) | 18-GON | 4 | 1:1:1:1 | 100°, 80°, 100°, 80° |
| 73 (CHAOS SHARP DIAMOND) | 18-GON | 4 | 1:1:1:1 | 140°, 40°, 140°, 40° |
| 79 (18 STAR) | 18-GON | 12 | TWELVE OF 1 | 260° AND 40° ALTERNATELY |
| 80 (FAT PARROT) | 24-GON | 5 | 1:1:1:1:1 | 45°, 195°, 60°, 105°, 135° |
| 90 (TILTED HOUSE) | 24-GON | 5 | 1:1:1:1:1 | 75°, 165°, 60°, 135°, 105° |
| 91 (24 PYRAMID) | 24-GON | 4 | 1:1:1:0.261 | 60°, 75°, 82.5°, 142.5° |
| 92 (24 SHARP DIAMOND) | 24-GON | 4 | 1:1:1:1 | 135°, 45°, 135°, 45° |
| 99 (24 STAR) | 24-GON | 12 | TWELVE OF 1 | 255° AND 45° ALTERNATELY |
| 125 (FORTUNE COOKIE) | MITRE | 6 | 1:1:1:1:1:1 | 270°, 60°, 90°, 150°, 90°. 60° |
| 135 (BOWTIE) | MITRE | 6 | 1:1:1:1:1:1 | 90°, 60°, 210°, 90°, 60°, 210° |
| 145 (FIGHTER JET) | MITRE | 6 | 1:1:1:1:1:1 | 60°, 150°, 60°, 210°, 30°, 210° |

FIG. 6

TESSELLATION SET

BACKGROUND OF THE INVENTION

This invention relates generally to tessellatable elements and more specifically, but not exclusively, to tessellations for covering surfaces.

The covering of surfaces such as floors, walls and ceilings with decorative patterns is well known. Often, floor surfaces are covered with bricks, paving stones or other such similar media. One way decorative patterns can be made is to periodically repeat shapes to build-up a mosaic-like covering. These types of patterns will often have an inherent symmetry; translational, rotational, etc.

Decorative patterns can be realised using such tessellatable elements as are disclosed in U.S. Pat. No. 5,945,181. Here, heptagonal and pentagonal elements are tessellated to produce patterns and/or decorations suitable for covering floor or walls.

Certain surface spaces cannot be tiled totally with heptagonal and/or pentagonal tiles only, since gaps will result if rectangular spaces are tiled with such elements. The only remedy to this problem would be to cut the tiles to achieve 'wall-to-wall' coverage. The aesthetic nature of designs made with such tiles is also limited.

The present invention arose in an attempt to provide a set of elements capable of tessellating a surface which is delimited by straight perimeter edges or otherwise, without having to pre-cut any of the elements.

It was also desirable to minimise the number of different shaped elements within a given set, and also to devise sets whose elements could be interchanged.

A further object of the invention is to provide a set of elements which can be tessellated in many different ways, to produce very attractive patterns.

BRIEF SUMMARY OF THE INVENTION

According to a first aspect of the present invention there is provided a set of tessellatable elements comprising:

- a four-sided element with internal angles of 60°, 75°, 90° and 135°;
- a five-sided element with internal angles of 60°, 105°, 105°, 135° and 135°; and
- a four-sided element with internal angles of 60°, 90°, 90° and 120°.

According to a second aspect of the present invention there is provided a set of tessellatable elements comprising:

- a five-sided element with internal angles of 30°, 60°, 90°, 150° and 210°; and
- a five-sided element with internal angles of 60°, 90°, 90°, 150° and 150°.

According to a third aspect of the present invention there is provided a set of tessellatable elements comprising:

- a five-sided element with internal angles of 40°, 60°, 100°, 140° and 200°; and
- a five-sided element with internal angles of 60°, 80°, 100°, 140° and 160°.

According to a fourth aspect of the present invention there is provided a set of tessellatable elements comprising:

- a five-sided element with internal angles of 45°, 60°, 105°, 135° and 195°; and
- a five-sided element with internal angles of 60°, 75°, 105°, 135° and 165°.

The elements are preferably tiles, bricks or paving slabs for covering or decorating wall or floor surfaces without the need for cutting or trimming the elements.

In a further aspect, the present invention provides a set of tessellatable elements comprising any two or more of any individual elements forming part of any of the sets according to any of the first to fourth aspects of the invention.

In a further aspect, the present invention provides a set of tessellatable elements comprising any two or more of the elements hereinafter described and shown.

In accordance with other aspects of the invention, pieces or elements of the various sets (Mitre, 12-gon, 18-gon, 24-gon) can be used with the same set or in another or other sets to form geometric figures (e.g., squares, hexagons and triangles), periodic tiling patterns and aperiodic tiling patterns, sequences of geometric and polygonal figures (e.g., squares, hexagons, etc. of increasing size and/or with nested figures), tilings which share the same topology, and tilings with various axes of symmetry.

BRIEF DESCRIPTION OF THE DRAWINGS

Embodiments of the present invention will now be described, by way of example only, with reference to the accompanying drawings in which:

FIGS. 5*a* to 5*j* show still further possible tessellations incorporating elements according to the present invention;

FIG. 6 is a list of selected elements, their angles and relative lengths of sides;

DETAILED DESCRIPTION OF THE PREFERRED EMBODIMENTS

Figure 1:
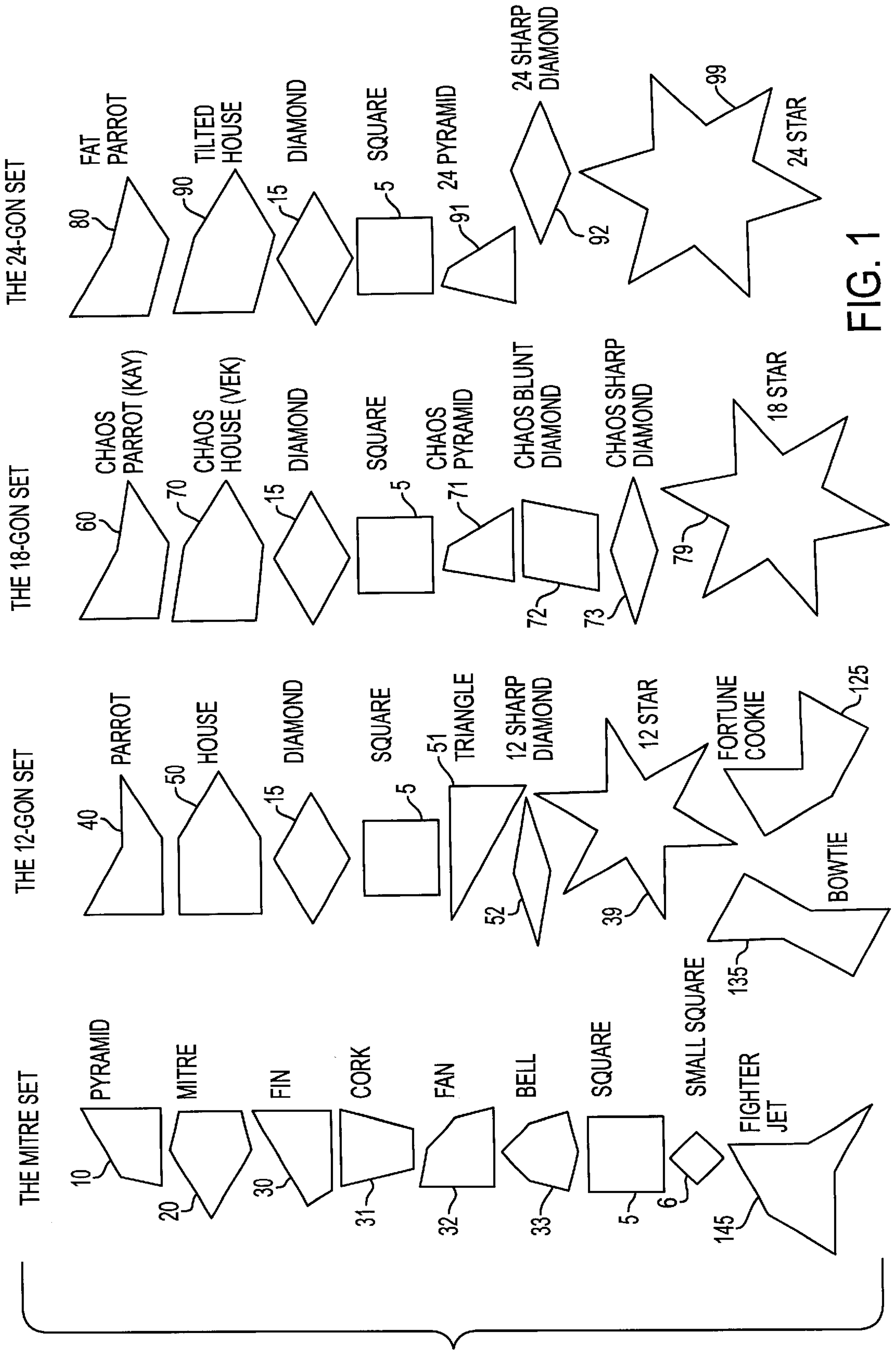
FIG. 1 shows entire sets of tessellatable elements incorporating those according to the present invention.

As can be seen from FIG. 1, there are four separate sets: the Mitre, the 12-gon, the 18-gon and the 24-gon, in preferred embodiments.

The elements have arbitrarily been accorded descriptive names in this specification, for case of reference and understanding. These descriptive names are not intended to be limiting in any way, they are merely useful descriptive labels by which the elements and sets can be known.

The 12-gon set is so-called since it can be used, inter alia, to tile a regular 12-gon polygon in many ways.

The 18-gon set can similarly tile a regular 18-gon polygon.

The 24-gon set can similarly tile a regular 24-gon polygon.

There are some elements that are common to some of the sets. For example the square is a constituent of all sets other than the 18-gon set, whereas the diamond is common to all sets other than the Mitre set. However, the reader should note that any element from any set may be used in conjunction with elements from one or more of the remaining sets; elements are transposable.

In some embodiments, the key elements of each set are:
elements 10, 20 and 30 for the Mitre set;
elements 40 and 50 for the 12-gon set;
elements 60 and 70 for the 18-gon set; and
elements 80 and 90 for the 24-gon set.

Effective tessellations may be made from these elements alone (i.e. a tessellation can be formed from elements 10, 20 and 30, a further tessellation can be formed from elements 40 and 50, and so on).

However, other embodiments can use other combinations.

Table 1 below gives the internal angles of each element 10 to 90 mentioned above.

| Element | Set | No. Sides | Ratio | Internal Angles |
|---|---|---|---|---|
| 10 | Mitre | 4 | 0.518:1:1:1 | 90°, 60°, 75°, 135° |
| 20 | Mitre | 5 | 1:0.518:1:0.518:1 | 60°, 135°, 105°, 105, 135° |
| 30 | Mitre | 4 | 1:1:1.366:0.355 | 90°, 60°, 120°, 90° |
| 40 | 12-gon | 5 | 1:1:1:1:1 | 60°, 90°, 150°, 30°, 210° |
| 50 | 12-gon | 5 | 1:1:1:1:1 | 90°, 90°, 150°, 60°, 150° |
| 60 | 18-gon | 5 | 1:1:1:1:1 | 40°, 200°, 60°, 100°, 140° |
| 70 | 18-gon | 5 | 1:1:1:1:1 | 80°, 160°, 60°, 140°, 100° |
| 80 | 24-gon | 5 | 1:1:1:1:1 | 45°, 195°, 60°, 105°, 135° |
| 90 | 24-gon | 5 | 1:1:1:1:1 | 75°, 165°, 60°, 135°, 105° |

FIG. 1 also shows several supplementary elements. Elements 25, 35 and 45 are derived from concatenating two or more pyramids 10 from the Mitre set. FIG. 6 lists each of the elements, and gives the number of sides, ratio of sides, and internal angles of each element, together with a descriptive name for that element. The elements will usually be in the size ratio shown, to each other. That is, a side of length (ratio) unit in one element is the same size as a side of length (ratio) unit in a second element, and so on. Thus, the term ratio in this specification relates to the ratios of the length of sides of an element to each other, and to the lengths of the sides of the other elements.

Figure 2A:
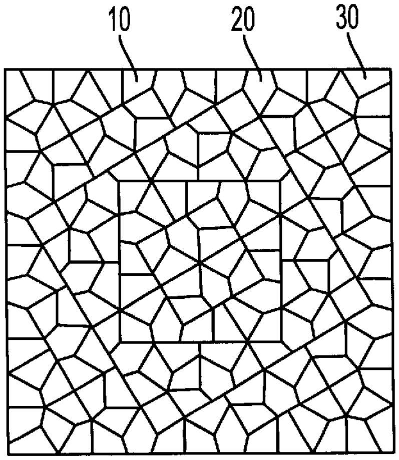
FIGS. 2*a* to 2*d* show various tessellations including elements according to the present invention.
Figure 2B:
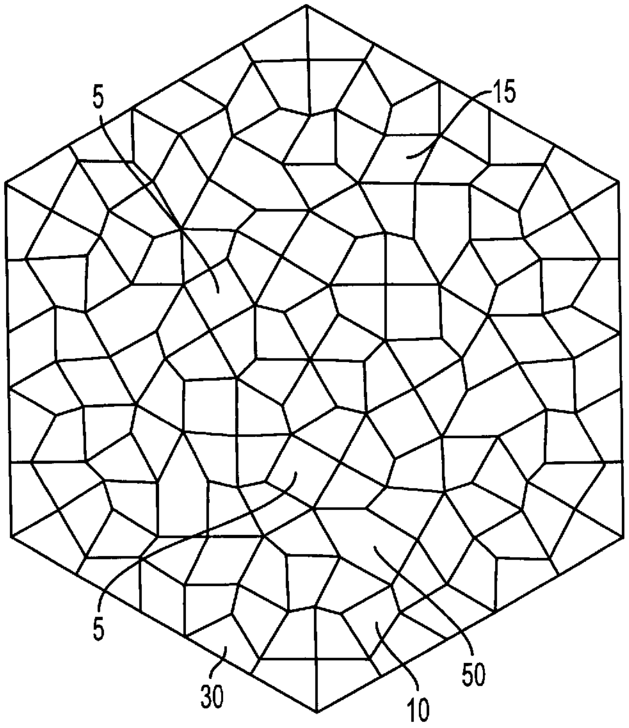
Figure 2C:
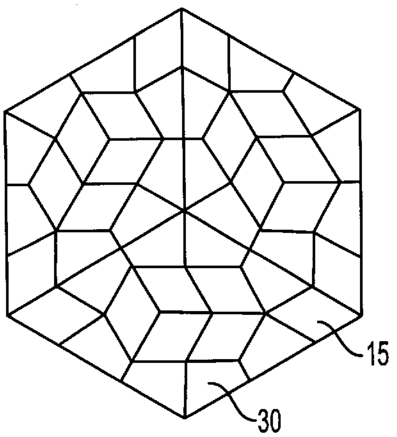
Figure 2D:
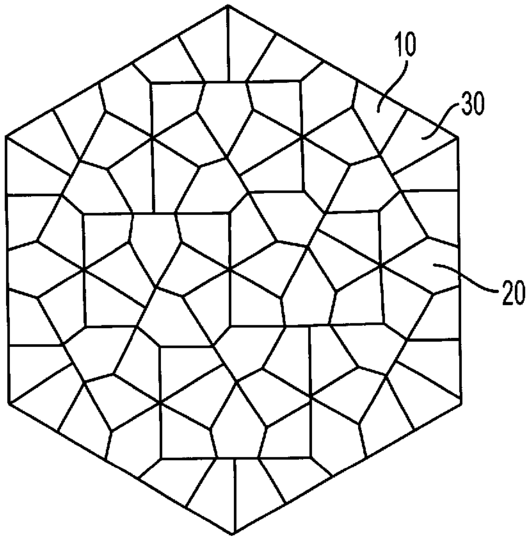
Figure 3A:
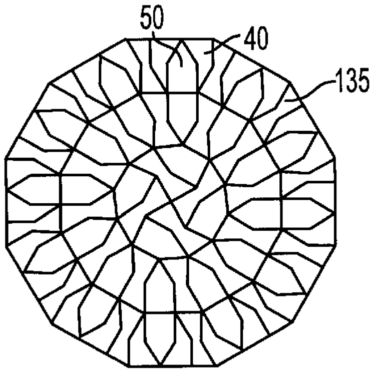
FIGS. 3*a* to 3*g* show further possible tessellations including elements according to the present invention.
Figure 3B:
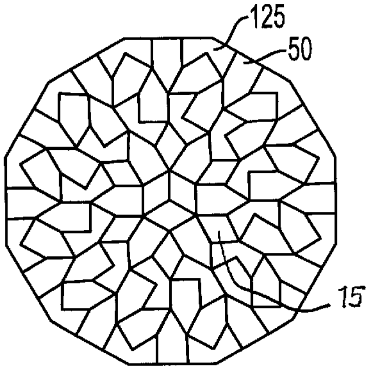
Figure 3C:
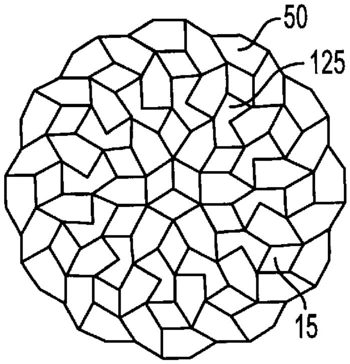
Figure 3D:
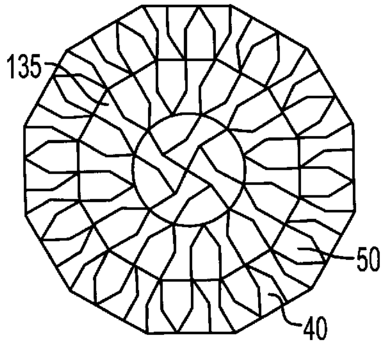
Figure 3E:
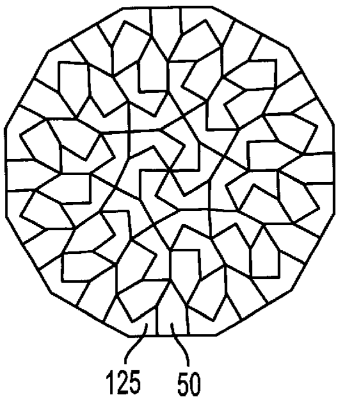
Figure 3F:
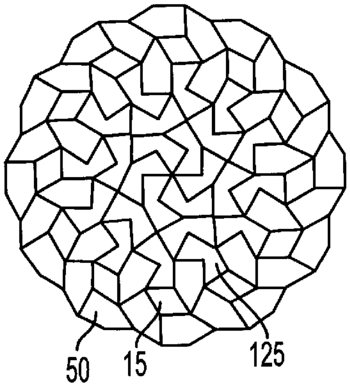
Figure 3G:
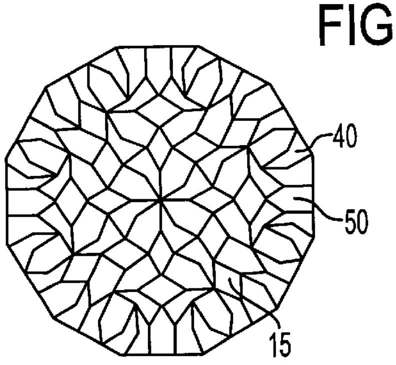

FIGS. 2*a* to 2*d* illustrate several tessellations formed using elements 10, 20 and 30 from the Mitre set. The tessellation shown in FIG. 2*b* includes two elements common to several sets, the diamond shape 15 and the square shape 5. The figure shows how elements from other sets may also be used together. Here, the 'house' element 50 appears several times in the pattern. The pattern depicted in FIG. 2*c* is constructed entirely form elements 30 and 15.

The figures demonstrate the flexibility of the Mitre set; the set can be used to construct a variety of square and hexagonal tessellations. The reader will be aware that the set is not limited to these types of shape only. These have been shown only as an example of the possibilities that such a set of tessellatable elements allows.

FIGS. 3*a* to 3*g* show tessellations built around the element 50 from the 12-gon set. By using this element in conjunction with element 40 from the same set, a multitude of patterns and designs are possible. Here, several dodecagon-type patterns are illustrated.

Figure 4:
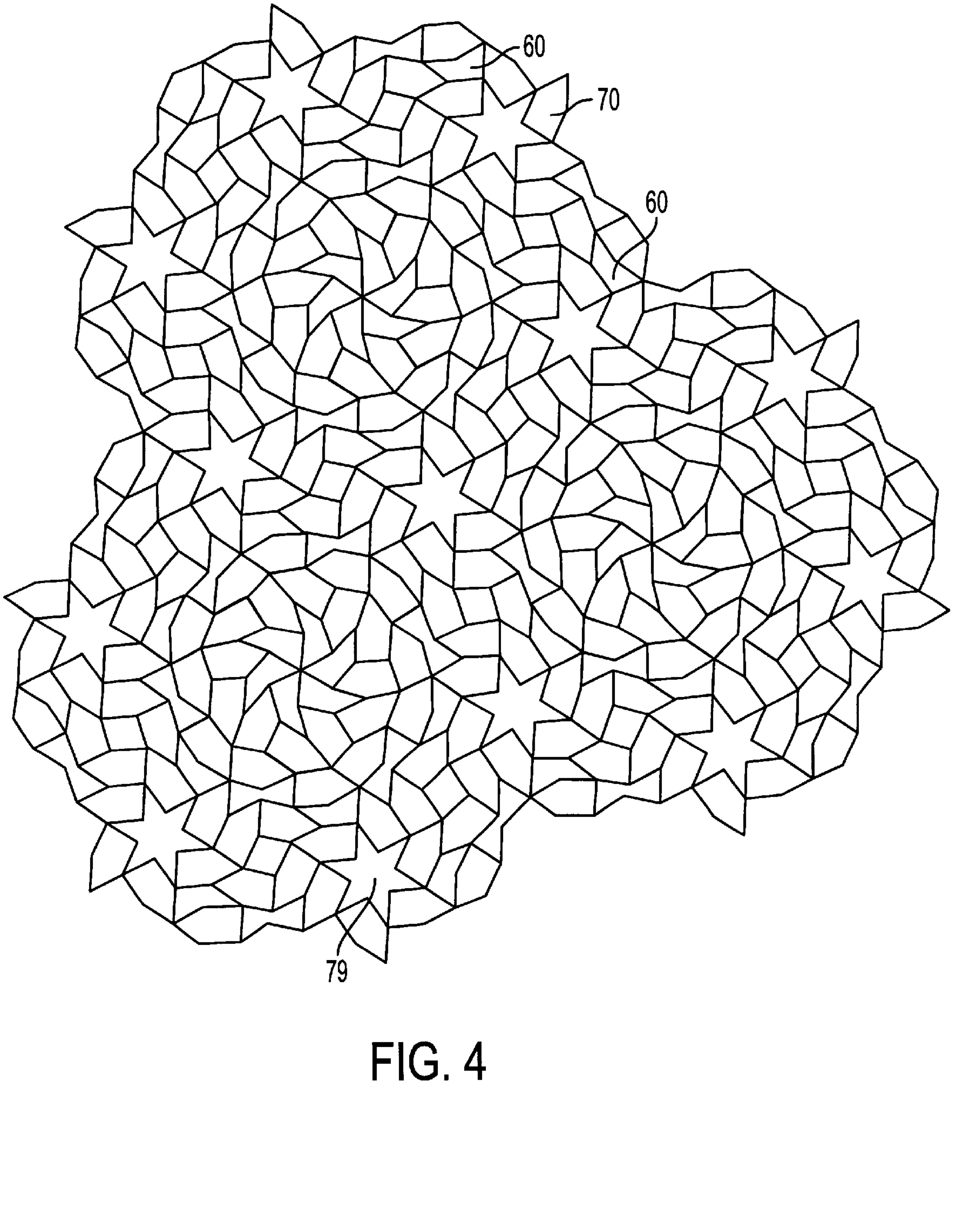
FIG. 4 shows another tessellation utilising of the present invention.
Figure 5A:
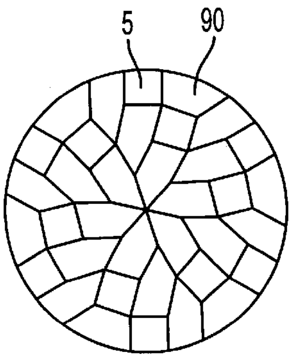
Figure 5B:
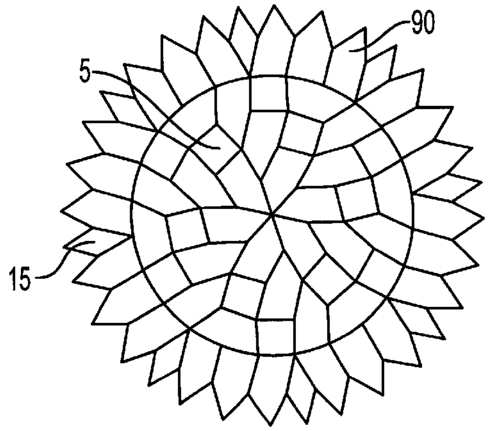
Figure 5C:
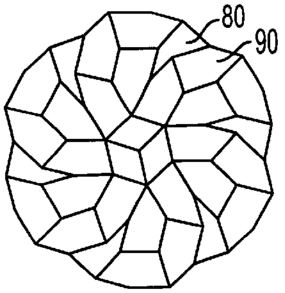
Figure 5D:
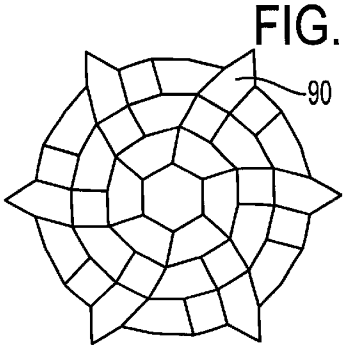
Figure 5E:
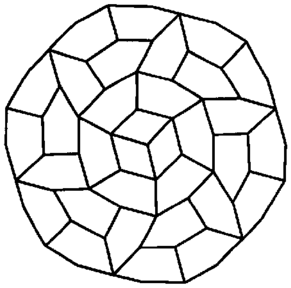
Figure 5F:
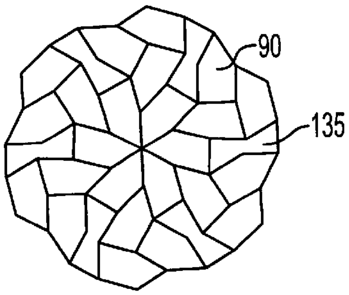
Figure 5H:
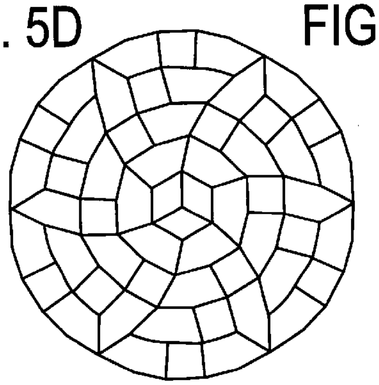
Figure 5I:
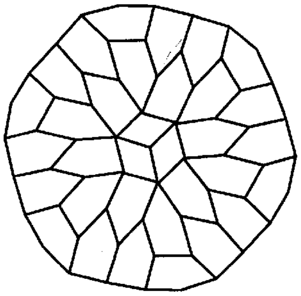
Figure 5J:
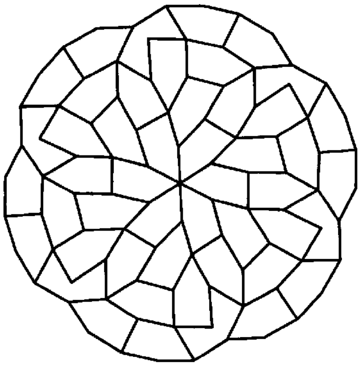

In the same way, FIGS. 4 and 5*a* to 5*j* illustrate possible patterns using shapes from the 18-gon set, in the case of FIG. 4, and the 24-gon set in FIGS. 5*a* to 5*j*.

All elements shown in the figures can be used, without cutting, to form continuous periodic and non-periodic tessellations. Non-periodic tessellations fall into two groups: 'Amenable' tessellations and 'Obstinate' tessellations. All the elements may be used in any of these three ways.

Groups of these elements have many different ways of being combined to form Periodic tessellations in any direction. Periodic tessellations using these elements would be particularly suitable for the vertical and horizontal decoration of shopping arcades, building interiors and exteriors, and wherever repetition and regularity is an advantage.

"Amenable" Non-Periodic tessellations are groups of elements which have many different ways of being combined, to continue the tessellation in any direction. These are particularly suitable for puzzles and games, where pieces are continuously added to the playing surface.

"Obstinate" Non-Periodic tessellations are groups of elements which only form a continuous tessellation in all directions with considerable difficulty. Such tessellations are suitable for board games where the printed playing surface is printed once, and played with on different occasions. Such tessellations are also suitable for situations where the extra design effort is warranted, for example custom-designed quilts.

The following is a non-exhaustive list of possible applications for any or all of the above described elements.

Public Horizontal Paving—public paved areas, city centres, pedestrian areas, seafront promenades, waterfront terraces, school playgrounds, shopping mall floors, hotel and office building atriums, courtyards, etc.

Domestic Horizontal Paving—garden paths, terraces, barbecue areas, verandas, paved indoor rooms (including floors of kitchens and bathrooms), etc.

Public Vertical Tiling—on sides of buildings, on faces of walls, embankment retaining walls, passages and walls of railway and underground railway stations, pedestrian underpasses (under roads), etc.

Domestic Vertical Tiling—on sides of buildings, on faces of walls, on walls of indoor rooms (including walls of kitchens and bathrooms), etc.

Quilt Making—hand-made crafts, including hand-stitched quilts, tapestry, needlepoint, etc, would be able to use these various shaped pieces, in various combinations.

Printed Patterns—tessellations using these shaped pieces could be used wherever patterns are used, including but not restricted to tablecloths, curtains, roller-blind designs, fabric designs, floor-covering designs (carpets, linoleum, etc), computer screen-savers, etc.

Games and Puzzles—the various pieces can be made in plastic, acrylic, plywood, printed cardboard or other game-making and puzzle-making materials, to provide a wide range of different games and puzzles, including but not restricted to the following variations. Firstly, games and puzzles involving the placing of pieces of different plane shapes (and different colours, different vertical heights, etc) to create a different tiled pattern each time, according to given rules. A 'dominoes' type of game may be created, such as one in which colours, numbers, letters or other indicia or markings on or towards respective sides or faces of tiles have to be matched or connected according to a set of rules.

Board Games—board games can be printed with a tessellation using various shapes. The unfamiliar shapes, and the strategic play potential that such a layout provides, is a valuable innovation. The "Duals" of the shapes may be particularly significant, especially in forming continuous paths, routes, channels or railway lines across the board.

Screen-based Computer and Internet Games—all game principles described above will apply equally to games and puzzles played on the screens of computers, arcade machines, etc.

Maze Construction—patterns of these pieces can be used to create mazes in various materials.

There are many advantages of using these elements to tessellate surfaces, one such being that there are relatively few shapes, thus even if the design requires 2, 3 or more colours as well, the total number of stock items is relatively few.

Also, no cutting is required. This greatly reduces the labour involved for installation especially for decorative paving or vertical tiling work. Firstly, this reduces the total cost of the project. Secondly, it reduces the duration of inconvenience whilst the work is installed. Thirdly, the absence of cutting eliminates the cutting dust associated with the installation of paving schemes.

The elements have sides of unitary ratio. This allows pieces to be accurately assembled in any configuration, without loss of dimensional accuracy in the "x" and "y" directions. Also, the pieces can be scaled up or down for different applications (e.g. street paving would involve a larger module than ceramic wall tiling). Thirdly, for special installations, the pieces can be precisely re-scaled and made as "specials", to fit any given space.

The elements are preferably straight sided. This allows a consistent and uniform thickness of mortar or grouting to be inserted throughout the design, for maximum stability and strength. Also, this allows a uniform size of "spacer" or "nib" to be added to each piece, where these are used to establish precise distances between pieces.

Entire patterns using these elements can nevertheless achieve straight perimeter edges, thus allowing the decorative patterns to interface with straight perimeter borders and other edges.

However, in some variants, some or all of the elements need not be straight sided. They may be arcuate, or have arcuate portions, or have protrusions, recesses, or other configurations enabling connection of adjacent elements (i.e. an interlocking pattern). Thus, jigsaw puzzle type shapes can be created, or indeed zig-zag patterns that would define only certain combinations of adjacent side (e.g. for a card game).

The final results that can be achieved are very attractive and therefore provide high added-value, which can be used to promote the location as a whole.

Each of the systems described above has flexibility of use as described below.

Further aspects of the invention include the following.

With respect to the whole system:

Pieces of the Mitre Tiling System, used together, can form Squares, Hexagons and Triangles, and also aperiodic tiling pattterns.

Each of four principal sets of shapes (Mitre, 12-gon, 18-gon and 24-gon Sets), works on its own to create many useful tiling patterns.

The discovery that various pieces from the four principal sets can also be used interchangeably with each other.

With respect to the Mitre set:

The Mitre set (one of the sets of pieces) can form a series of nested Squares of different sizes. A sequence of 6 consecutive squares of increasing size has been demonstrated.

The Mitre Set (one of the sets of pieces) can form various Hexagons of different sizes. Three different sizes of Hexagons have been demonstrated.

The discovery that Periodic tiling patterns can be created using pieces in the "Mitre Set" that have 2, 3, 4, 6 and 12 axes of symmetry.

With respect to the 12-gon Set:

The discovery of tilings using 12-gon pieces and 18-gon pieces which share the same topology.

The discovery of tilings using pieces in our "12-gon Set" that fill 12-sided regular polygons of various sizes.

The discovery of Periodic tiling patterns using pieces in the "12-gon Set" that have 2, 3, 4, 6 and 12 axes of symmetry.

With respect to the 18-gon Set ("Chaos Tiles"):

The discovery of Aperiodic tiling patterns can be created using 18-gon pieces.

The discovery of tilings using pieces in the "18-gon Set" that fill 18 sided regular polygons of various sizes.

The discovery of periodic tiling patterns using pieces in the "18-gon Set" that have 3, 6, 9 and 18 axes of symmetry.

With respect to the 24-gon Set:

The discovery of tilings using 12-gon pieces and 24-gon pieces which share the same topology.

The discovery of tilings using pieces in the "24-gon Set" that fill 24-sided regular polygons of various sizes.

The discovery of Periodic tiling patterns using pieces in the "24-gon Set" that have 2, 3, 4, 6, 12 and 24 axes of symmetry.

Figure 7:
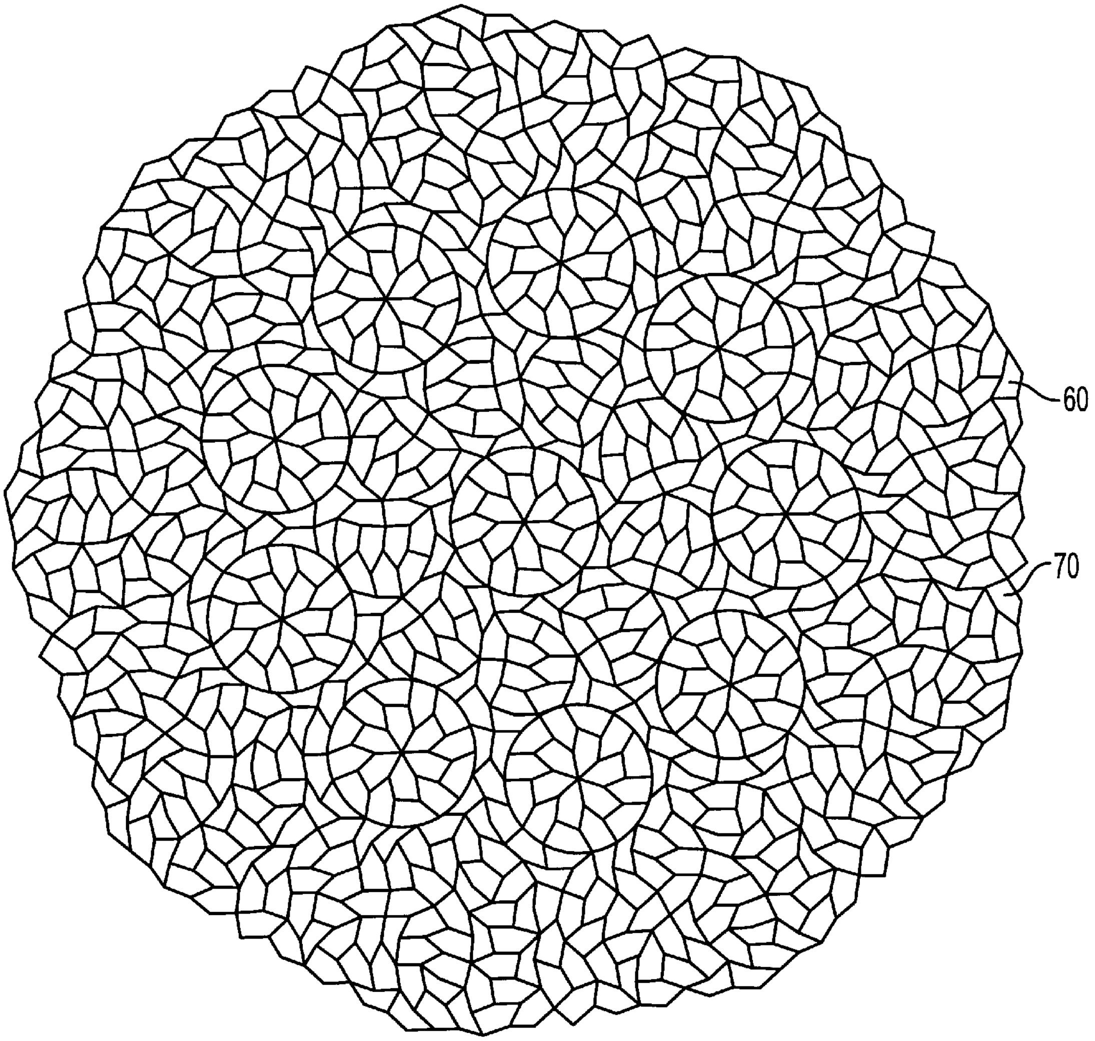
FIG. 7 shows another tessellation utilising elements embodiments of the present invention.

FIG. 7 shows a tiling formed from elements 60 (Chaos Parrot) and 70 (Chaos House).

Figure 8:
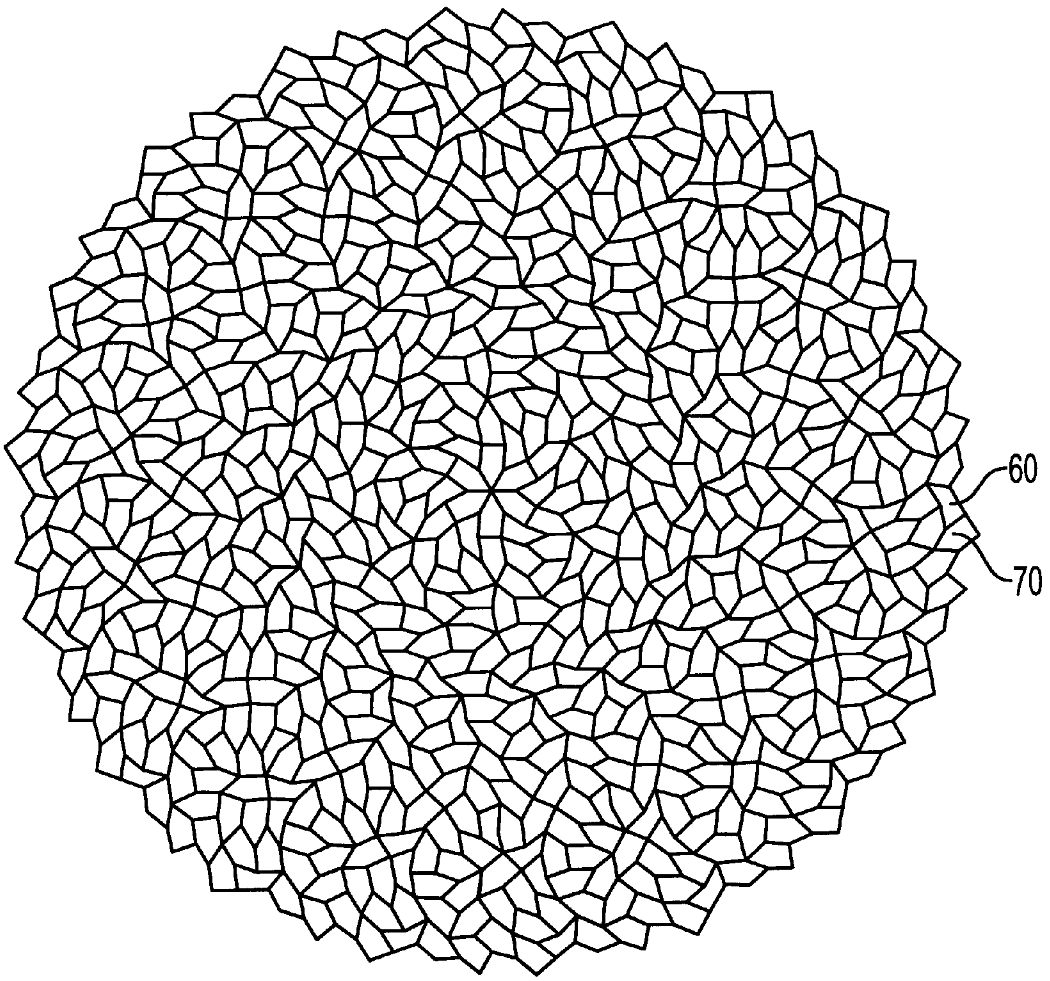
FIG. 8 shows another tessellation utilising elements of the present invention, the tessellation having 18-fold symmetry and employing diamonds.

FIG. 8 shows an alternative tiling, having 18-fold symmetry. By employing diamonds, for example, many more patterns may be realised.

Figure 9:
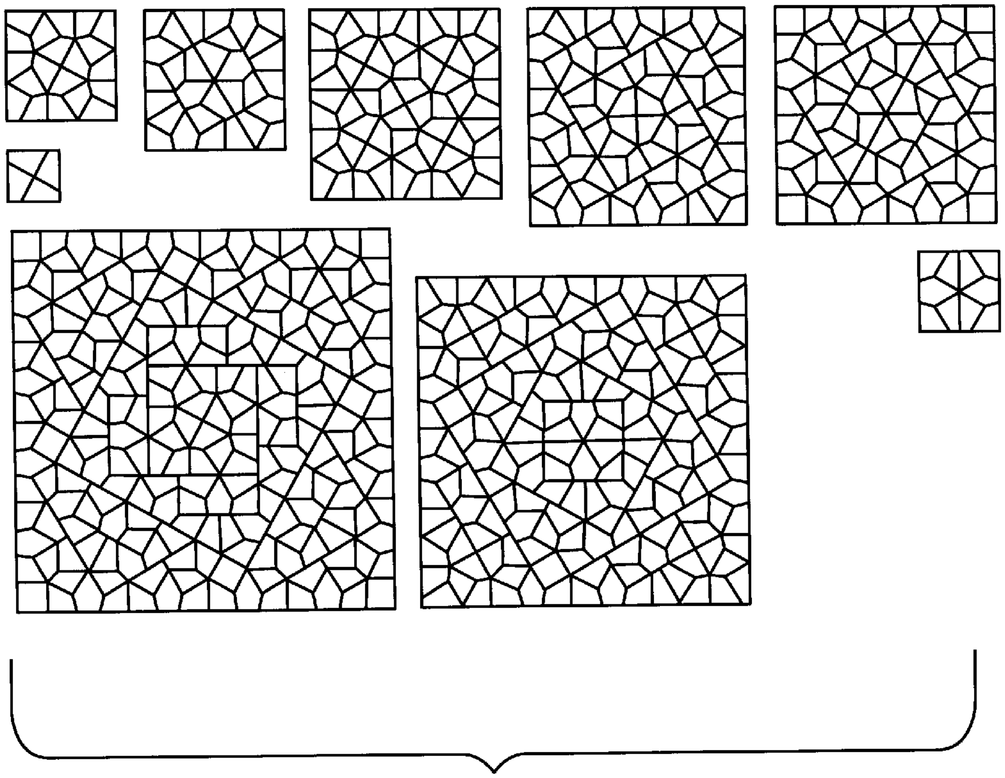
FIG. 9 shows a series of tessellations utilizing elements of the present invention forming squares of different sizes in accordance with the invention.

FIG. 9, shows how a series of squares of different sizes can be formed. Many other squares can of course be formed in different embodiments of the invention.

The patterns shown herein are simply non-limiting examples. Many other patterns, configurations and combinations of tiles or shapes can be used within the scope of the invention.

What is claimed is:

1. A set of tessellatable elements comprising, at least;

a four-sided element with internal angles of 60°, 75°, 90° and 135°;

a five-sided element with internal angles of 60°, 135°, 105°, 105° and 135°; and a four-sided element with internal angles of 60°, 90°, 90° and 120°.

2. A set as claimed in claim 1, wherein the elements comprise at least;

a four-sided element with internal angles of 90°, 60°, 75° and 135°, and side lengths of ratio 0.518:1:1:1;

a five-sided element with internal angles of 60°, 135°, 105°, 105° and 135°, and side lengths of ratio 1:0.518:1:0.518:1; and a four-sided element with internal angels of 90°, 60°, 120° and 90°, and side lengths of ratio 1:1:1.366:0.355.

3. A set as claimed in claim 2, further comprising at least one further element selected from the group comprising:

a square with side lengths of ratio 1:1:1:1;

a square with side lengths of ratio 0.518:0.518:0.518:0.518;

a four-sided element with internal angles of 60°, 120°, 60° and 120°, and side lengths of ratio 1:1:1:1;

a four-sided element with internal angles of 105°, 105°, 75° and 75°, and side lengths of ratio 1:1:1:0.482;

a five-sided element with internal angles of 90°, 75°, 150°, 150° and 75°, and side lengths of ratio 1:1:three of 0.518;

a six-sided element with internal angles of 90°, 120°, 90°, 120°, 90° and 120°, and all side lengths of ratio 0.518;

a six-sided element with internal angles of 270°, 60°, 90°, 150°, 90° and 60°, and side lengths of ratio 1:1:1:1:1:1;

a six-sided element with internal angles of 90°, 60°, 210°, 90°, 60° and 210°, and side lengths of ratio 1:1:1:1:1:1; and a six-sided element with internal angles of 60°, 150°, 60°, 210°, 30° and 210°, and side lengths of ratio 1:1:1:1:1:1.

4. A set of tessellatable elements comprising, at least:

a five-sided element with internal angles of 60°, 90°, 150°, 30° and 210°; and a five-sided element with internal angles of 90°, 90°, 150°, 60° and 150°.

5. A set as claimed in claim 4, wherein the elements comprises at least:

a five-sided element with internal angles of 60°, 90°, 150°, 30° and 210°, and side lengths of ratio 1:1:1:1:1;

a five-sided element with internal angles of 90°, 90°, 150°, 60° and 150°, and side lengths of ratio 1:1:1:1:1.

6. A set as claimed in claim 5, further comprising at least one further element selected from the group comprising:

a four-sided element with internal angles of 60°, 120°, 60° and 120°, and side lengths of ratio 1:1:1:1;

a twelve-sided element of internal angles 270° and 30° alternately, and side lengths all of ratio 1;

a triangle of internal angles 90°, 60°, 30°, and side lengths of ratio 1:2:1.732;

a four-sided element of internal angles 150°, 30°, 150° and 30°, and side lengths of ratio 1:1:1:1.

7. A set of tessellatable elements comprising:

a five-sided element with internal angles of 40°, 200°, 60°, 100° and 140°; and a five-sided element with internal angles of 80°, 160°, 60°, 140° and 100°.

8. A set as claimed in claim 7, wherein the elements comprise at least:

a five-sided element with internal angles of 40°, 200°, 60°, 100° and 140°, and side lengths of ratio 1:1:1:1:1;

a five-sided element with internal angles of 80°, 160°, 60°, 140°and 100°, and side lengths of ratio 1:1:1:1:1.

9. A set as claimed in claim 8, further comprising at least one further element selected from the group comprising:

a four-sided element with internal angles of 60°, 120°, 60° and 120°, and side lengths of ratio 1:1:1:1;

a four-sided element with internal angles of 60°, 80°, 80° and 140°, and side lengths of ratio 1:1:1:0.347;

a four-sided element with internal angles of 100°, 80°, 100° and 80°, and side lengths of ratio 1:1:1:1;

a four-sided element with internal angles of 140°, 40°, 140° and 40°, and side lengths of ratio 1:1:1:1;

a twelve-sided element of internal angles 260° and 40° alternately, and all sides of ratio 1.

10. A set of tessellatable elements comprising:

a five-sided element with internal angles of 45°, 195°, 60°, 105° and 135°; and a five-sided element with internal angles of 75°, 165°, 60°, 135° and 105°.

11. A set as claimed in claim 10, wherein the elements comprise at least a five-sided element of internal angles 45°, 195°, 60°, 105° and 135°, and side lengths of ratio 1:1:1:1:1;

a five-sided element with internal angles of 75°, 165°, 60°, 135° and 105°, and side lengths of ratio 1:1:1:1:1.

12. A set as claimed in claim 11, further comprising at least one further element selected from the group comprising:

a four-sided element with internal angles of 60°, 120°, 60° and 120°, and side lengths of ratio 1:1:1:1;

a four-sided element with internal angles of 60°, 75°, 82.5° and 142.5°, and side lengths of ratio 1:1:1:0.261;

a four-sided element with internal angles of 135°, 45°, 135° and 45°, and side lengths of ratio 1:1:1:1;

a twelve-sided element of internal angles 255° and 45° alternately, and side lengths all of ratio 1.

13. A set of tessellatable elements comprising, at least, any two sets selected from the group of sets comprising:

(a) at least:

a four-sided element with internal angles of 60°, 75°, 90° and 135° a five-sided element with internal angles of 60°, 135°, 105°, 105° and 135°; and a four-sided element with internal angles of 60°, 90°, 90° and 120°;

wherein these elements comprise at least;

a four sided element with internal angles of 90°, 60°, 75° and 135°, and side lengths of ratio 0.518:1:1:1;

a five-sided element with internal angles of 60°, 135°, 105°, 105° and 135°, and side lengths of ratio 1:0.518:1:0.518:1; and a four-sided element with internal angles of 90°, 60°, 120° and 90°, and side lengths of ratio 1:1:1.366:0.355;

(b) a five-sided element with internal angles of 40°, 200°, 60°, 100° and 140°; and a five-sided element with internal angles of 80°, 160°, 60°, 140° and 100°;

wherein these elements comprise at least:

a five-sided element with internal angles of 40°, 200°, 60°, 100° and 140°, and side lengths of ratio 1:1:1:1:1;

a five-sided element with internal angles of 80°, 160°, 60°, 140° and 100°, and side lengths of ratio 1:1:1:1:1; and (c) a five-sided element with internal angles of 45°, 195°, 60°, 105° and 135°; and a five-sided element with internal angles of 75°, 165°, 60°, 135° and 105°;

wherein these elements comprise at least a five-sided element of internal angles 45°, 195°, 60°, 105° and 135°, and side lengths of ratio 1:1:1:1:1;

a five-sided element with internal angles of 75°, 165°, 60°, 135° and 105°, and side lengths of ratio 1:1:1:1:1.

14. A set of tessellatable elements comprising, at least, two of the elements selected from the group comprising:

| No. Sides | Ratio | Internal Angles |
|---|---|---|
| 4 | 1:1:1:1 | 90°, 90°, 90°, 90° |
| 4 | four of 0.518 | 90°, 90°, 90°, 90° |
| 4 | 0.518:1:1:1 | 90°, 60°, 75°, 135° |
| 4 | 1:1:1:1 | 60°, 120°, 60°, 120° |
| 5 | 1:0.518:1:0.518:1 | 60°, 135°, 105°, 105°, 135° |
| 4 | 1:1:1.366:0.355 | 90°, 60°, 120°, 90° |
| 4 | 1:1:1:0.482 | 105°, 105°, 75°, 75° |
| 5 | 1:1:three of 0.518 | 90°, 75°, 150°, 150°, 75° |
| 6 | six of 0.518 | 90°, 120°, 90°, 120°, 90°, 120° |
| 12 | twelve of 1 | 270° and 30° alternately |
| 5 | 1:1:1:1:1 | 60°, 90°, 150°, 30°, 210° |
| 5 | 1:1:1:1:1 | 90°, 90°, 150°, 60°, 150° |
| 3 | 1:2:1.732 | 90°, 60°, 30° |

-continued

| No. Sides | Ratio | Internal Angles |
|---|---|---|
| 4 | 1:1:1:1 | 150°, 30°, 150°, 30° |
| 5 | 1:1:1:1:1 | 40°, 200°, 60°, 100°, 140° |
| 5 | 1:1:1:1:1 | 80°, 160°, 60°, 140°, 100° |
| 4 | 1:1:1:0.347 | 60°, 80°, 80°, 140° |
| 4 | 1:1:1:1 | 100°, 80°, 100°, 80° |
| 4 | 1:1:1:1 | 140°, 40°, 140°, 40° |
| 12 | twelve of 1 | 260° and 40° alternately |
| 5 | 1:1:1:1:1 | 45°, 195°, 60°, 105°, 135° |
| 5 | 1:1:1:1:1 | 75°, 165°, 60°, 135°, 105° |
| 4 | 1:1:1:0.261 | 60°, 75°, 82.5°, 142.5° |
| 4 | 1:1:1:1 | 135°, 45°, 135°, 45° |
| 12 | twelve of 1 | 255° and 45° alternately |
| 6 | 1:1:1:1:1:1 | 270°, 60°, 90°, 150°, 90°, 60° |
| 6 | 1:1:1:1:1:1 | 90°, 60°, 210°, 90°, 60°, 120° |
| 6 | 1:1:1:1:1:1 | 60°, 150°, 60°, 210°, 30°, 210° |

15. A set of elements as claimed in claim 14, comprising any two or more of the elements selected from the group comprising:

a four-sided element with internal angles of 90°, 60°, 75° and 135°, and side lengths of ratio 0.518:1:1:1;

a five-sided element with internal angles of 60°, 135°, 105°, 105° and 135°, and side lengths of ratio 1:0.518:1:0.518:1;

a four-sided element with internal angels of 90°, 60°, 120° and 90°, and side lengths of ratio 1:1:1.366:0.355;

a square with side lengths of ratio 1:1:1:1;

a square with side lengths of ratio 0.518:0.518:0.518:0.518;

a four-sided element with internal angles of 60°, 120°, 60° and 120°, and side lengths of ratio 1:1:1:1;

a four-sided element with internal angles of 105°, 105°, 75° and 75°, and side lengths of ratio 1:1:1:0.482;

a five-sided element with internal angles of 90°, 75°, 150°, 150° and 75°, and side lengths of ratio 1:1:three of 0.518;

a six-sided element with internal angles of 90°, 120°, 90°, 120°, 90° and 120°, and all side lengths of ratio 0.518;

a six-sided element with internal angles of 270°, 60°, 90°, 150°, 90° and 60°, and side lengths of ratio 1:1:1:1:1:1;

a six-sided element with internal angles of 90°, 60°, 210°, 90°, 60° and 210°, and side lengths of ratio 1:1:1:1:1:1; and a six-sided element with internal angles of 60°, 150°, 60°, 210°, 30° and 210°, and side lengths of ratio 1:1:1:1:1:1.

16. A set of elements as claimed in claim 14, comprising two or more of the elements selected from the group comprising:

five-sided element with internal angles of 60°, 90°, 150°, 30° and 210°, and side lengths of ratio 1:1:1:1:1;

a five-sided element with internal angles of 90°, 90°, 150°, 60° and 150°, and side lengths of ratio 1:1:1:1:1;

four-sided element with internal angles of 60°, 120°, 60° and 120°, and side lengths of ratio 1:1:1:1;

a twelve-sided element of internal angles 270° and 30° alternately, and side lengths all of ratio 1;

triangle of internal angles 90°, 60°, 30°, and side lengths of ratio 1:2:1.732;

a four-sided element of internal angles 150°, 30°, 150° and 30°, and side lengths of ratio 1:1:1:1.

17. A set of elements as claimed in claim 14, comprising any two or more of the elements selected from the group comprising:

five-sided element with internal angles of 40°, 200°, 60°, 100° and 140°, and side lengths of ratio 1:1:1:1:1;

a five-sided element with internal angles of 80°, 160°, 60°, 140° and 100°, and side lengths of ratio 1:1:1:1:1;

four-sided element with internal angles of 60°, 120°, 60° and 120°, and side lengths of ratio 1:1:1:1;

a four-sided element with internal angles of 60°, 80°, 80° and 140°, and side lengths of ratio 1:1:1:0.347;

four-sided element with internal angles of 100°, 80°, 100° and 80°, and side lengths of ratio 1:1:1:1;

a four-sided element with internal angles of 140°, 40°, 140° and 40°, and side lengths of ratio 1:1:1:1;

twelve-sided element of internal angles 260° and 40° alternately, and all sides of ratio 1.

18. A set of elements as claimed in claim 14, comprising any two or more of the elements selected from the group comprising:

five-sided element of internal angles 45°, 195°, 60°, 105° and 135°, and side lengths of ratio 1:1:1:1:1;

a five-sided element with internal angles of 75°, 165°, 60°, 135° and 105°, and side lengths of ratio 1:1:1:1:1;

four-sided element with internal angles of 60°, 120°, 60° and 120°, and side lengths of ratio 1:1:1:1;

a four-sided element with internal angles of 60°, 75°, 82.5° and 142.5°, and side lengths of ratio 1:1:1:0.261;

four-sided element with internal angles of 135°, 45°, 135° and 45°, and side lengths of ratio 1:1:1:1;

a twelve-sided element of internal angles 255° and 45° alternately, and side lengths all of ratio 1.

19. A set of tiles comprising two or more tessellatable elements as claimed in claim 14.

20. Paving tiles, comprising a set of tiles as claimed in claim 19.

21. Game apparatus comprising tessellation elements as claimed in claim 14.

22. A set of tessellatable elements as claimed in claim 14, wherein all the elements have straight edges.

23. A set of tessellatable elements as claimed in claim 14, arranged for display on a computer or visual display screen.

24. A set of tessellatable elements comprising at least one of the following:

(a) pieces of a Mitre Set, a 12-gon Set, an 18-gon Set and a 24-gon Set;

(b) pieces of the Mitre set arranged in an adjacent relationship to form a plurality of nested squares of different sizes;

(c) pieces of the Mitre Set arranged to form tiling patterns that have 2, 3, 4, 6 and 12 axes of symmetry;

(d) pieces of the 12-gon and 18-gon Sets arranged to share the same topology;

(e) pieces of the 12-gon Set arranged to fill a plurality of 12-sided regular polygons of different sizes;

(f) pieces of the 12-gon Set arranged to form tiling patterns that have 2, 3, 4, 6 and 12 axes of symmetry;

(g) pieces of the 18-gon Set arranged to form aperiodic tiling patterns;

(h) pieces of the 18-gon Set arranged to fill a plurality of 18-sided regular polygons of different sizes;

(i) pieces of the 18-gon Set arranged to form periodic tiling patterns that have 3, 6, 9 and 18 axes of symmetry;

(j) pieces of the 12-gon set and the 24-gon set arranged to share the same topology;

(k) pieces of the 24-gon Set that arranged to form tilings that fill a plurality of 24-sided regular polygons of different sizes; and (l) pieces of the 24-gon Set arranged to form periodic tiling patterns that have 2, 3, 4, 6, 12 and 24 axes of symmetry.

* * * * *